(12) United States Patent
Miya

(10) Patent No.: US 6,961,869 B2
(45) Date of Patent: Nov. 1, 2005

(54) ELECTRONIC APPARATUS AND CORRECTION METHOD

(75) Inventor: Noriko Miya, Kanagawa (JP)

(73) Assignee: Sony Corporation, Tokyo (JP)

( * ) Notice: Subject to any disclaimer, the term of this patent is extended or adjusted under 35 U.S.C. 154(b) by 493 days.

(21) Appl. No.: 10/202,112

(22) Filed: Jul. 25, 2002

(65) Prior Publication Data

US 2003/0041282 A1 Feb. 27, 2003

(30) Foreign Application Priority Data

Jul. 26, 2001 (JP) .......................... P2001-226063

(51) Int. Cl.⁷ ............................................. G06F 11/00
(52) U.S. Cl. ............................. 714/6; 714/23; 714/25
(58) Field of Search ................................. 714/6, 23, 25

(56) References Cited

U.S. PATENT DOCUMENTS 4,400,798 A * 8/1983 Francis et al. ............... 365/174
4,802,119 A * 1/1989 Heene et al. .................... 714/7
5,574,926 A * 11/1996 Miyazawa et al. ............ 712/38
5,592,613 A * 1/1997 Miyazawa et al. ............. 714/6
6,237,120 B1 * 5/2001 Shimada et al. ............. 714/726
6,341,239 B1 * 1/2002 Hayashi et al. ............... 700/79

* cited by examiner

Primary Examiner—Nadeem Iqbal
Assistant Examiner—Timothy M. Bonura
(74) Attorney, Agent, or Firm—Oblon, Spivak, McClelland, Maier & Neustadt, P.C.

(57) ABSTRACT

An electronic apparatus includes a master chip for writing correction data, which is input from an external communication controller via an external bus, to an EEPROM. After a system reset, the master chip reads the correction data written to the EEPROM. If it is determined that the data read from the EEPROM is the correction data, the master chip replaces a portion to be corrected in an existing program with the read correction data and downloads (uploads) a corrected program into a slave chip.

5 Claims, 7 Drawing Sheets

FIG. 5

| | |
|---|---|
| gul_ICPDdata | --- REPLACEMENT DATA |
| gus_ICPDadrs | --- REPLACEMENT ADDRESS |
| gus_ICPJadrs | --- BRANCH ADDRESS |
| guc_ICPJofst | --- START OFFSET OF BRANCH DATA IN EEPROM |
| guc_ICPJbyte | --- NUMBER OF BYTES OF BRANCH DATA |
| guc_ICPstate | --- INFORMATION INDICATING ENABLEMENT OF CORRECTION DATA IN EACH SLAVE CHIP OR CHANNEL |
| guc_ICPLadrs | --- ADDRESS EXTENSION INFORMATION |

ELECTRONIC APPARATUS AND CORRECTION METHOD

BACKGROUND OF THE INVENTION

1. Field of the Invention

The present invention relates to electronic apparatuses and correction methods, and more particularly relates to an electronic apparatus and a correction method for correcting an error or a bug in a mass-produced electronic device without directly and physically correcting the components thereof.

2. Description of the Related Art

In known electronic apparatuses, a downloaded program in a ROM (Read Only Memory) in a master chip incorporated in the electronic apparatus is fixed data. If a bug is detected in the downloaded program after mass production, the bug must be corrected by again mass producing microcomputers, which are the master chips, and by replacing the old master chips with new master chips.

When the components are corrected directly, the labor costs are high. In addition to high costs, a large amount of time is required by a repair manufacturer to recall electronic apparatuses having a bug, to replace old components with new components, and to send the repaired electronic apparatuses back to users.

In densely-packed electronic apparatuses such as camcorders, it is difficult to correct the internal components thereof.

SUMMARY OF THE INVENTION

In view of the foregoing circumstances, when an error or a bug occurs in a mass-produced electronic apparatus after mass production, it is an object of the present invention to correct a downloaded program, which is fixed data, without directly and physically correcting the components of the electronic apparatus.

An electronic apparatus according to an aspect of the present invention includes a first storage unit for storing a fixed program; a second storage unit for storing externally supplied correction data; a reading unit for reading the correction data, which is stored in the second storage unit, after a system reset; and a correction unit for correcting the fixed program stored in the first storage unit on the basis of the correction data read by the reading unit.

The correction unit may correct a portion to be corrected in the fixed program by replacing the portion to be corrected with the correction data.

The correction unit may replace a portion to be corrected in the fixed program with a branch instruction specifying a jump to the correction data.

The second storage unit comprises an EEPROM.

A correction method according to another aspect of the present invention includes a first storage control step of controlling storage of a fixed program; a second storage control step of controlling storage of externally supplied correction data; a reading step of reading the correction data, whose storage is controlled in the second storage control step, after a system reset; and a correction step of correcting the fixed program, whose storage is controlled in the first storage control step, on the basis of the correction data read in the reading step.

According to an electronic apparatus and a correction method of the present invention, a fixed program is stored, and externally supplied correction data is also stored. After a system reset, the stored correction data is read. The fixed program is corrected on the basis of the read correction data. Accordingly, when an error occurs in a mass-produced electronic apparatus, a downloaded program, which is fixed data, can be corrected without directly and physically correcting the components of the electronic apparatus.

BRIEF DESCRIPTION OF THE DRAWINGS

FIG. 5 illustrates program codes;

DESCRIPTION OF THE PREFERRED EMBODIMENTS

Embodiments of the present invention will now be described with reference to the drawings.

Figure 1:
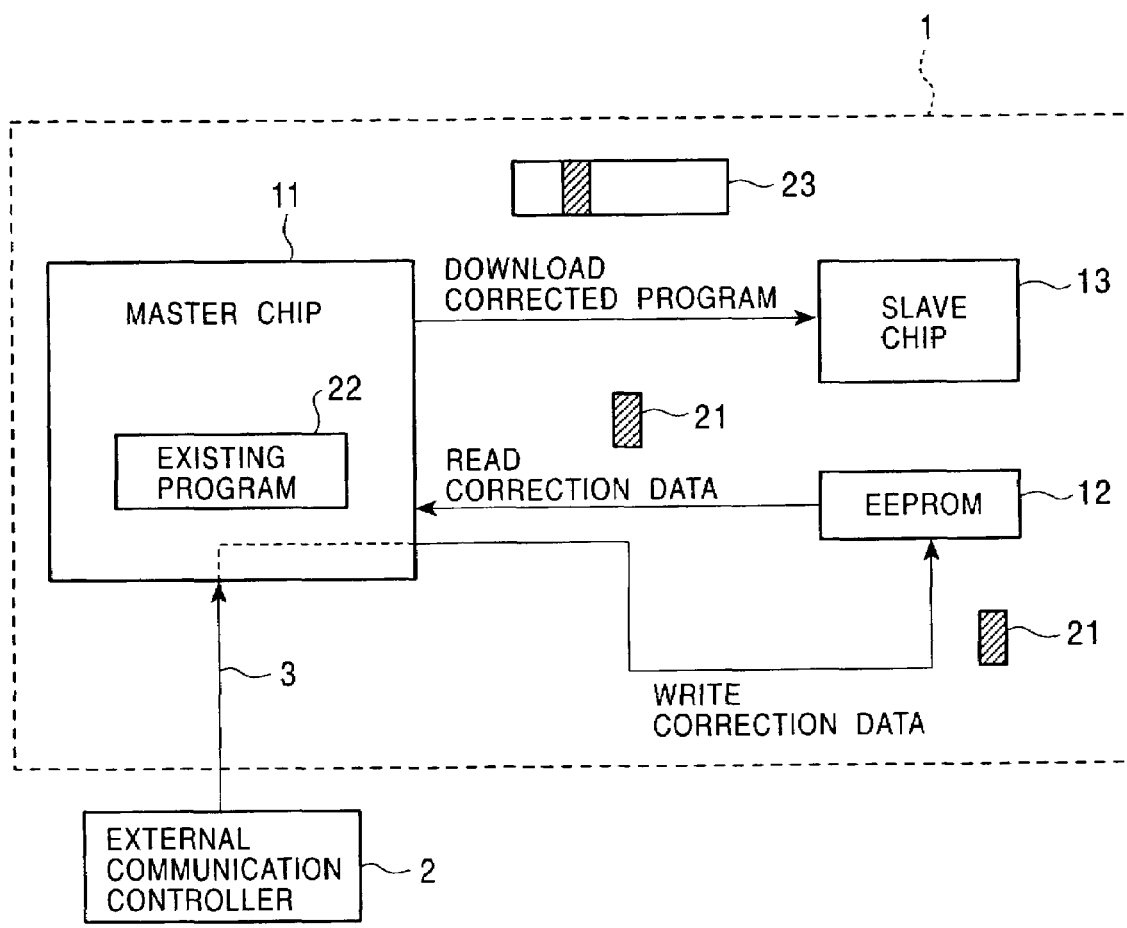
FIG. 1 is a block diagram showing an example of the internal configuration of an electronic apparatus to which the present invention is applied.

FIG. 1 shows an example of the internal configuration of an electronic apparatus to which the present invention is applied.

Referring to FIG. 1, an electronic apparatus 1 includes a master chip 11, an EEPROM (Electrically Erasable Programmable ROM) 12, and a slave chip 13. An external communication controller 2 is connected via an external bus 3 to the electronic apparatus 1.

The master chip 11 reads and executes a program stored in the slave chip 13 and performs internal processing. The read program is stored as an existing program 22 in the master chip 11 until the electronic apparatus 1 is turned off.

The external communication controller 2 is formed by, for example, an adjustment/inspection device or a remote controller. The external bus 3 may be wireless or wired. As communication protocols for the external bus 3, a protocol relating to the normal operation of the electronic apparatus 1 and a protocol for correcting the internal processing of the master chip 11 in the electronic apparatus 1 are provided.

The EEPROM 12 is used to maintain data (correction data 21) for correcting the internal processing of the electronic apparatus 1. The EEPROM 12 continues storing the data even after the electronic apparatus 1 is turned off. The internal processing is not corrected at the time the correction data 21 is written to the EEPROM 12.

The slave chip 13 is formed by, for example, an SOC (System On Chip) or a DSP (Digital Signal Processor). The slave chip 13 includes a slave chip A for checking for errors during transmission by performing parity checks every 4 bytes; a slave chip B for checking for errors during transmission by matching data every byte; and a slave chip C for checking for errors during transmission by performing a CRC (Cyclic Redundancy Check) of all transferred bytes.

The master chip 11 writes the correction data 21 (program addresses, correction bytes, and patch data), which is input by the external communication controller 2 via the external bus 3, to the EEPROM 12. When the system is reset, that is, when the electronic apparatus 1 is turned off and on again, the master chip 11 reads the correction data 21 written in the EEPROM 12.

If it is determined that the data read from the EEPROM 12 is the correction data 21, the master chip 11 replaces a portion to be corrected (bug) in the existing program 22 with the read correction data 21. The master chip 11 then downloads (uploads) a corrected program 23, in which the portion to be corrected has been replaced, into the slave chip 13.

Figure 2A:
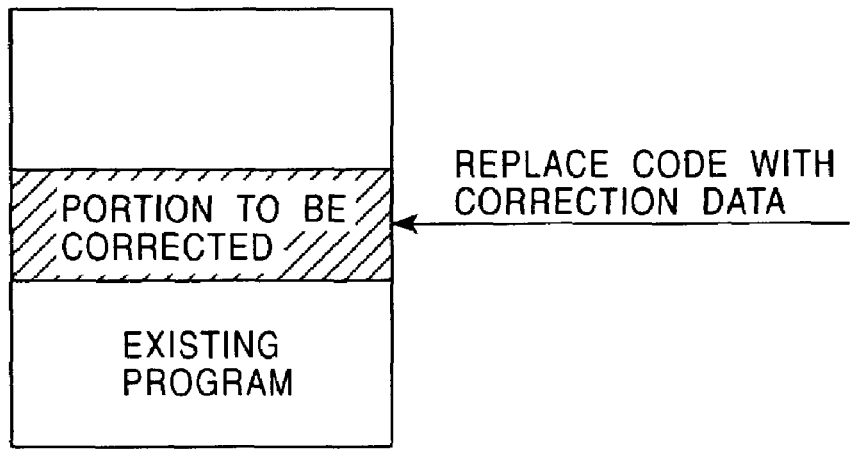
FIGS. 2A and 2B illustrate a correction method for correcting an existing program.
Figure 2B:
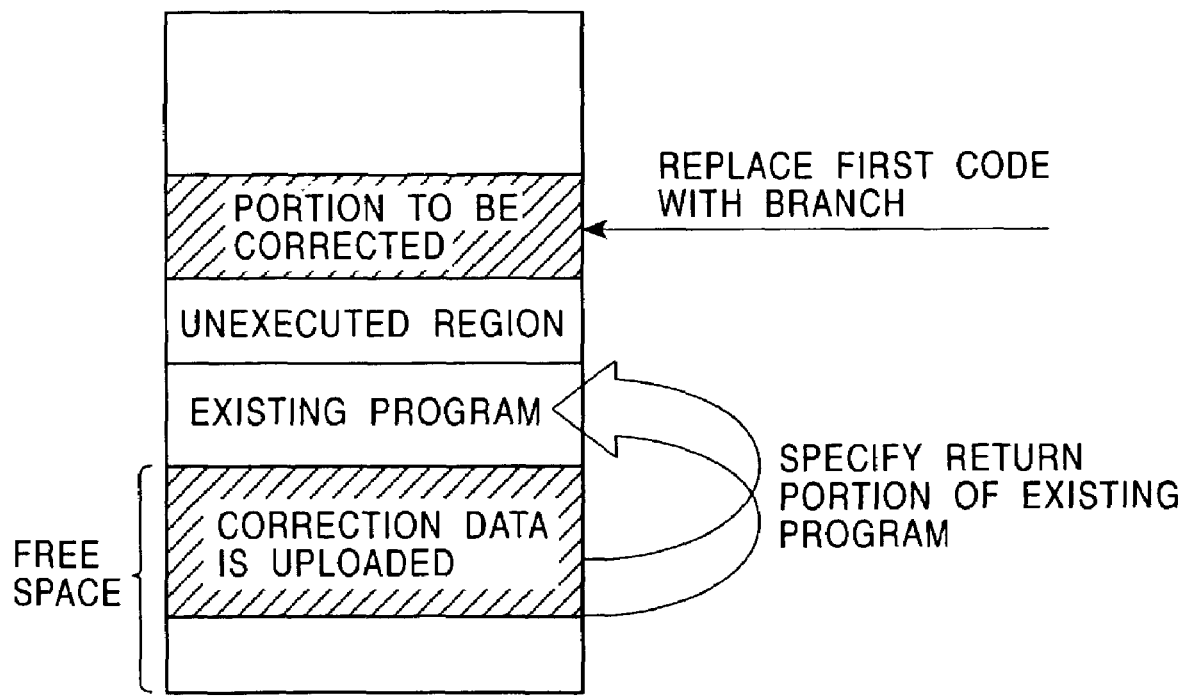

FIGS. 2A and 2B illustrate methods for correcting the existing program 22, which is written in the master chip 11, using the correction data 21.

Referring to FIG. 2A, the existing program 22 can be corrected by replacing a portion to be corrected in the existing program 22 with the read correction data 21. In other words, this correction method performs correction by using replacement data.

Referring to FIG. 2B, a first instruction code of a portion to be corrected in the existing program 22 is replaced with a branch instruction which specifies a jump to the correction data 21. The correction data 21 is stored (uploaded) into free space. At the end of the correction data 21, a return portion of the existing program 22 is specified. Accordingly, the existing program 22 can be corrected. In other words, this correction method performs correction by using branch data.

Figure 3:
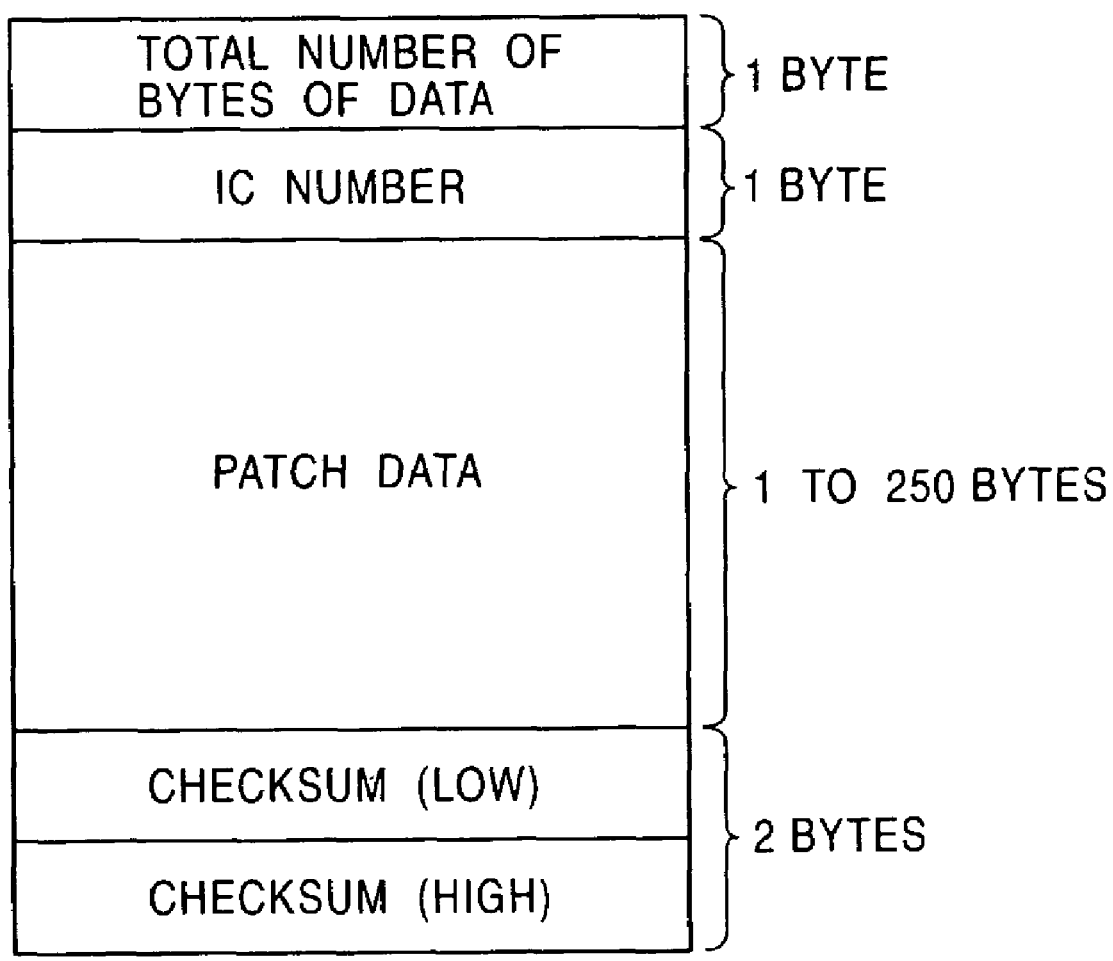
FIG. 3 illustrates an example of a description format of correction data.

FIG. 3 shows an example of a description format of the correction data 21 written into the EEPROM 12.

Referring to FIG. 3, the total number of bytes of a packet of the correction data 21 is represented by 1 byte. An IC number, which is used to determine the IC chip for the packet, is represented by 1 byte. Patch data (correction data 21) is represented by 1 to 250 bytes. A checksum low-byte and a checksum high-byte are represented by 2 bytes.

The data indicating the total number of bytes covers the range from itself to the checksum.

The checksum is (the sum of data from the data indicating the total number of bytes to data immediately prior to the checksum in byte units)+(offset data [2 bytes])+(checksum [2 bytes])=0000h (=2 bytes). In the offset data, the 8 high bits represent ROM version data and the 8 low bits represent the inverted ROM version data, thus forming 2-byte data.

Figure 4B:
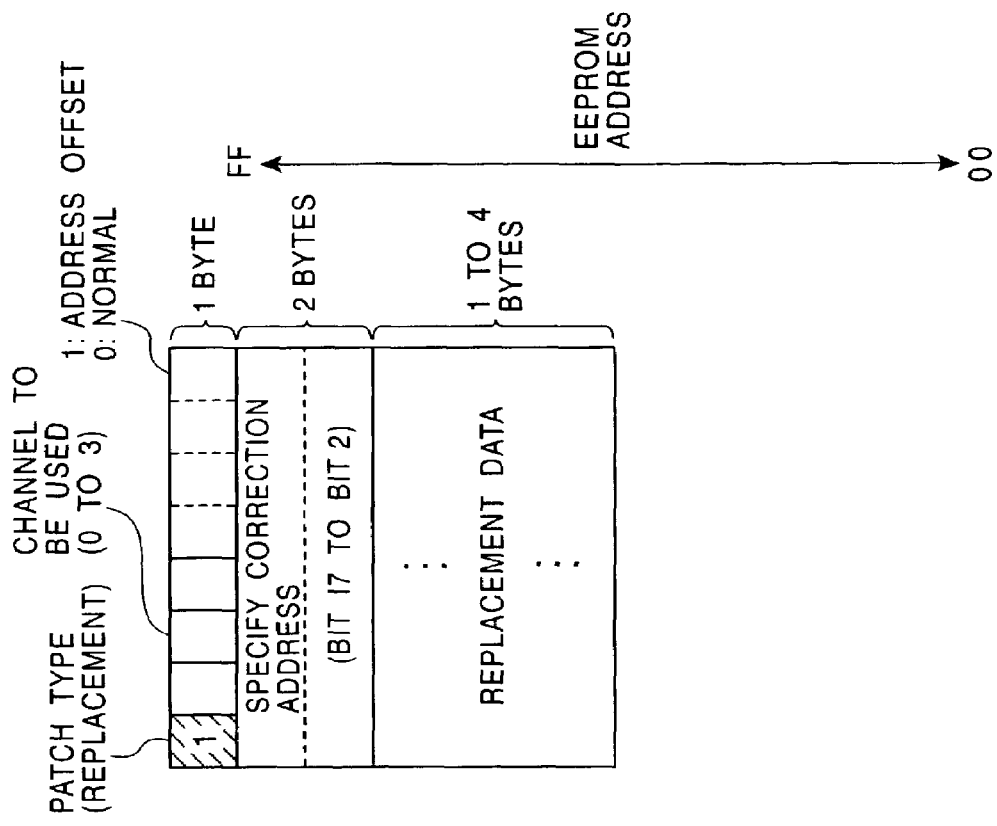
FIGS. 4A and 4B illustrate examples of data storage formats of an EEPROM.
Figure 4A:
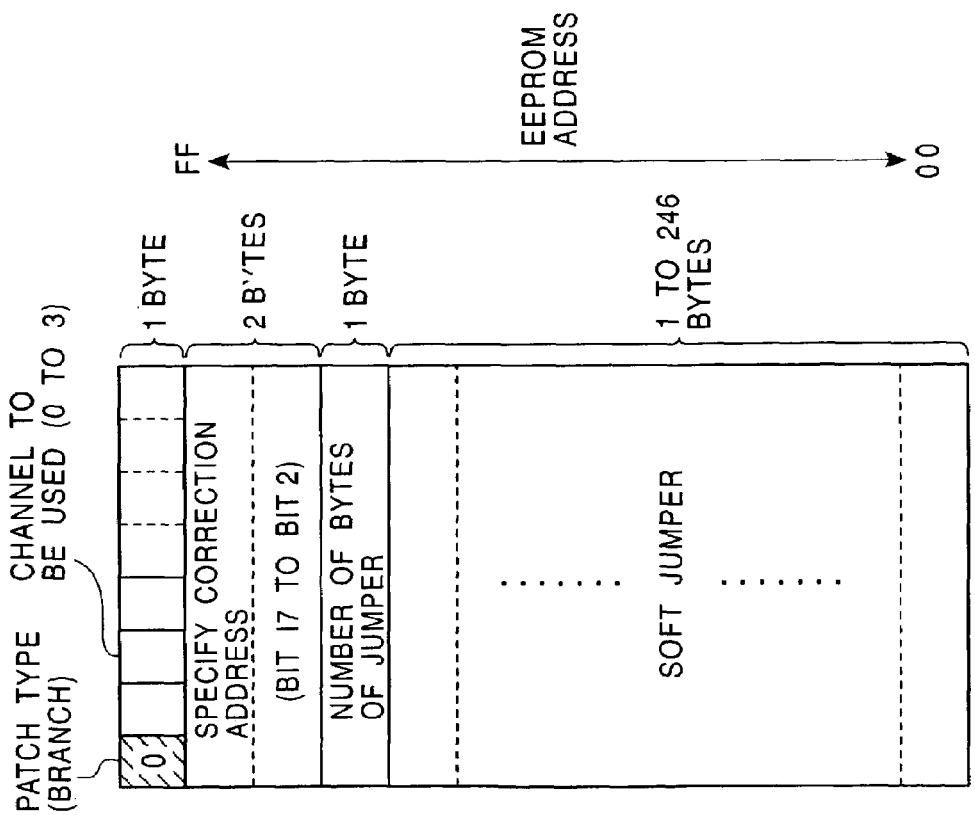

FIGS. 4A and 4B show examples of data storage formats in the EEPROM 12.

FIG. 4A shows an example in which branch-type correction data is stored in the EEPROM 12. Referring to FIG. 4A, the type of patch program, that is, the branch type or the replacement type, is specified in a region with address FF in the EEPROM 12 (1 byte). Also in this region, a channel to be used, from among channels 0 to 3, is specified. If the type of patch program is the branch type, "0" is specified. If the type of patch program is the replacement type, "1" is specified. In this case, "0" is specified.

In regions with addresses FE and FD in the EEPROM 12 (2 bytes), the address of a data portion to be corrected (correction address) is specified. In a region with address FC (1 byte), the number of bytes of a jumper is specified. In regions with addresses FB to 05 (1 to 246 bytes), a soft jumper is specified.

FIG. 4B shows an example in which replacement-type correction data is stored in the EEPROM 12. Referring to FIG. 4B, the type of patch program, that is, the branch type or the replacement type, is specified in a region with address FF in the EEPROM 12 (1 byte) ("1" is specified in this case). Also in this region, a channel to be used, from among channels 0 to 3, is specified. When the correction data is to be uploaded only into the slave chip C (slave chip for checking for errors during transmission by performing a CRC of all transferred bytes), whether or not the address offset is given (i.e., address offset or normal) is specified in the least significant bit (LSB). When other types of slave chips are used, an invalid bit "x" is specified. When the address offset is given, "1" is specified, whereas "0" is specified when it is normal.

The address of a data portion to be corrected (correction address) is specified in regions with addresses FE and FD in the EEPROM 12 (2 bytes). Replacement data is specified in regions with addresses FC to F9 (1 to 4 bytes). The replacement data is repeated from the most significant bit (MSB) side the number of times replacement is performed.

FIG. 5 illustrates program codes when the correction data 21 recorded in the EEPROM 12 is developed in the master chip 11.

Referring to FIG. 5, "gul_ICPDdata" is a program code indicating 4-byte replacement data; "gus_ICPDadrs" is a program code indicating 2-byte replacement address; "gus_ICPJadrs" is a program code indicating a 2-byte branch address; "gus_ICPJofst" is a program code indicating a start offset of branch data in the EEPROM 12; "guc_ICPJbyte" is a program code indicating the number of bytes of branch data; "guc ICPstate" is a program code indicating the enable state or channel of the correction data 21 in each slave chip; and "guc_ICPLadrs" is a program code indicating address extension information used only when the correction data 21 is uploaded to the slave chip C.

With these program codes, the master chip 11 can perform the internal processing, such as determining the type of the correction data 21, that is, the branch type or the replacement type, determining the number of bytes of the correction data 21, or determining the address of a portion to be corrected in the existing program 22.

Figure 6:
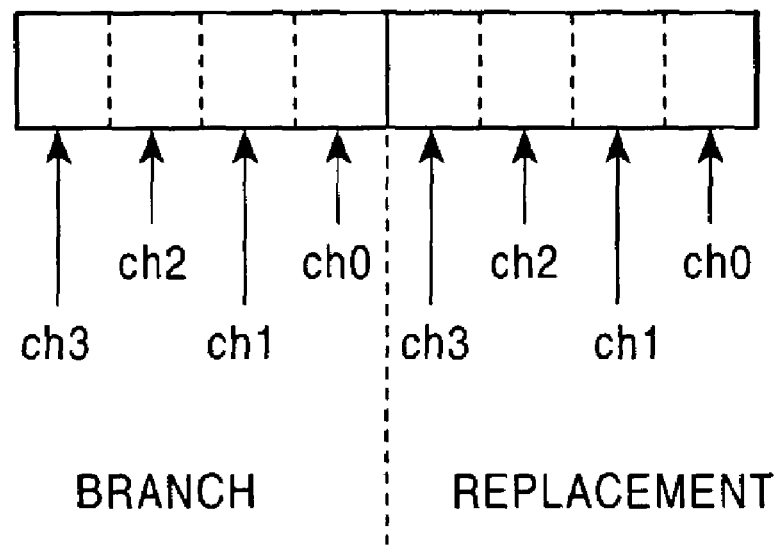
FIG. 6 illustrates examples of states.

FIG. 6 shows an example of a state used in the internal processing of the master chip 11. Referring to FIG. 6, 8 bits are used to indicate the channel to be used to correct the slave chip 13. Specifically, the master chip 11 determines whether or not to perform correction by determining whether or not the state is set to "1". If "1" is set in any one of the upper 4 bits, it is determined that the type of patch program (corrected program 21) is a branch type. In contrast, if "1" is set in any one of the lower 4 bits, it is determined that the type of patch program is a replacement type.

Figure 7:
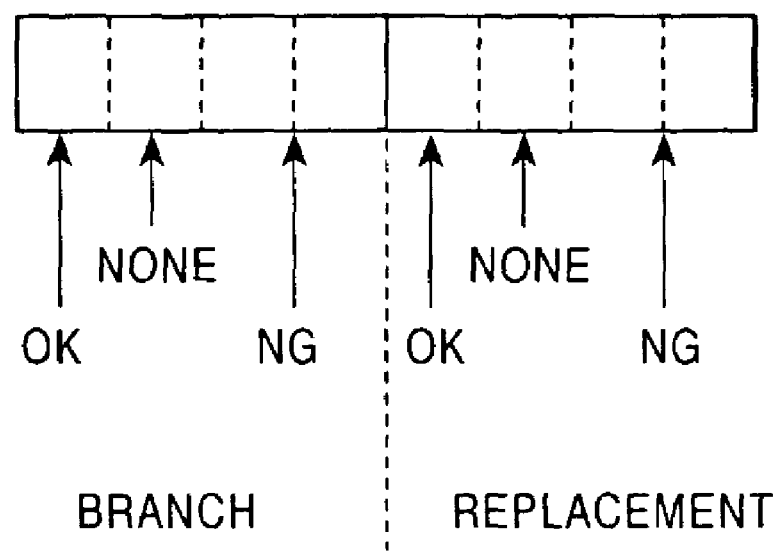
FIG. 7 illustrates examples of error codes.

FIG. 7 shows examples of error codes used in the internal processing of the master chip 11. An error code is used to determine whether or not the master chip 11 operates the slave chip 13 and indicates the state of the correction data 21 in the master chip 11. Referring to FIG. 7, if "1" is set in any one of the upper 4 bits, the type of patch program (corrected program) is a branch type. In contrast, if "1" is set in any one of the lower 4 bits, the type of patch program is a replacement type.

For example, when the error code is "0100 0100", it is determined that the condition that the correction data 21 is to be uploaded to the slave chip 13 is not satisfied. When the error code is "1000 1000", the condition that the correction data 21 is to be uploaded to the slave chip 13 is satisfied, and it is determined that the correction data 21 is normally read into the master chip 11. When the error code is "x0xx x0xx", the condition that the correction data 21 is to be uploaded to the slave chip 13 is satisfied; however, there is a certain bug in the correction data 21 while the correction data 21 is being developed in the master chip 11. Thus, it is determined that the correction data 21 is not read correctly.

Figure 8:
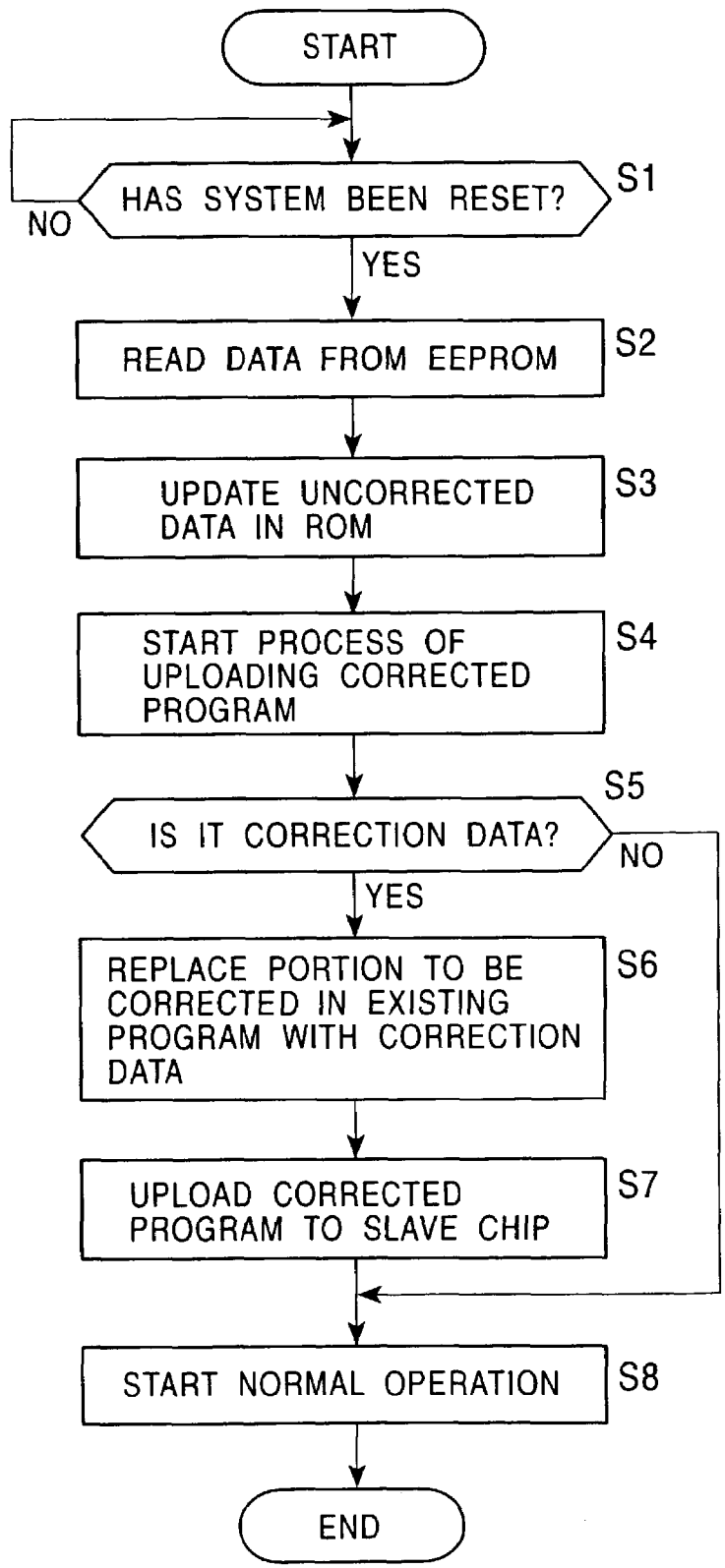
FIG. 8 is a flowchart showing a process of uploading a corrected program.

Referring to the flowchart of FIG. 8, a process of uploading the corrected program 23 will now be described. It is assumed that the correction data 21 has already been written to the EEPROM 12.

In step S1, the master chip 11 determines whether or not the electronic apparatus 1 has been reset. The determination processing is repeated until the system has been reset. If it is determined in step S1 that the electronic apparatus 1 has been reset, in step S2, the master chip 11 reads data from the EEPROM 12.

In step S3, the master chip 11 uploads uncorrected data in a ROM (that is, the slave chip 13). In step S4, the master chip 11 starts processing for uploading the corrected program.

In step S5, the master chip 11 determines whether or not the data read in step S2 is correction data. If it is determined that the data is not correction data, the process skips the processing in steps S6 and S7 and proceeds to step S8.

If it is determined in step S5 that the data read in step S2 is correction data, in step S6, the master chip 11 replaces a portion to be corrected in the existing program 22 with the correction data 21.

If, for example, the master chip 11 determines from program codes in the correction data 21 read from the EEPROM 12 that the correction data 21 is a replacement type, the master chip 11 replaces the portion to be corrected in the existing program 22 with the correction data 21 (FIG. 2A).

On the other hand, if, for example, the master chip 11 determines from program codes of the correction data 21 read from the EEPROM 12 that the correction data 21 is a branch type, the master chip 11 replaces a first instruction code of a portion to be corrected in the existing program 22 with a branch instruction specifying a jump to the correction data 21, and the master chip 11 stores the correction data 21 in free space. The master chip 11 specifies a return portion of the existing program 22 at the end of the correction data 21 (FIG. 2B).

In step S7, the master chip 11 uploads the corrected program 23, which is corrected in step S6 (program generated by correcting the existing program 22 using the correction data 21), into the slave chip 13.

In step S8, the master chip 11 starts the normal operation of the electronic apparatus 1.

Accordingly, by providing the externally-accessible EEPROM 12 in the electronic apparatus 1, the existing execution program (existing program 22) can be corrected without physically correcting the electronic apparatus 1.

Since it is unnecessary to exchange the master chip 11, the existing program 22 can be corrected at low cost.

Since the existing program 22 can be corrected in units of program instruction codes, the memory usage of the EEPROM 12 can be minimized.

What is claimed is:

1. An electronic apparatus comprising:
   first storage means for storing a fixed program;
   second storage means for storing externally supplied correction data, said correction data being arranged in a packet and said packet having a check sum configured to identify a packet error,
   reading means for reading the correction data, which is stored in the second storage means, after a system reset; and
   correction means for correcting the fixed program stored in the first storage means on the basis of the correction data read by the reading means.

2. An electronic apparatus according to claim 1, wherein the correction means corrects a portion to be corrected in the fixed program by replacing the portion to be corrected with the correction data.

3. An electronic apparatus according to claim 1, wherein the correction means replaces a portion to be corrected in the fixed program with a branch instruction specifying a jump to the correction data.

4. An electronic apparatus according to claim 1, wherein the second storage means comprises an EEPROM.

5. A correction method comprising:
   a first storage control step of controlling storage of a fixed program;
   a second storage control step of controlling storage of externally supplied correction data, said correction data being arranged in a packet and said packet having a check sum configured to identify a packet error,
   a reading step of reading the correction data, whose storage is controlled in the second storage control step, after a system reset; and
   a correction step of correcting the fixed program, whose storage is controlled in the first storage control step, on the basis of the correction data read in the reading step.

* * * * *